(12) United States Patent  (10) Patent No.: US 6,443,254 B1
McVaugh  (45) Date of Patent: *Sep. 3, 2002

(54) TRANSAXLE DEVICE (76) Inventor: Arthur K. McVaugh, Box 800, Green Lane, PA (US) 18054

( * ) Notice: Subject to any disclaimer, the term of this patent is extended or adjusted under 35 U.S.C. 154(b) by 0 days.

This patent is subject to a terminal disclaimer.

(21) Appl. No.: 09/621,219

(22) Filed: Jul. 21, 2000

Related U.S. Application Data (63) Continuation-in-part of application No. 09/074,642, filed on May 7, 1998, now Pat. No. 6,095,500, which is a continuation-in-part of application No. 08/692,380, filed on Aug. 5, 1996, now abandoned.

(51) Int. Cl.$^7$ .............................................. B60K 17/14
(52) U.S. Cl. ........................ 180/308; 180/367; 180/6.2; 91/534; 60/483
(58) Field of Search ................................ 180/6.2, 6.48, 180/6.7, 308, 367, 6.3; 91/534; 60/483

(56) References Cited

U.S. PATENT DOCUMENTS

| | | | |
|---|---|---|---|
| 3,874,619 A | * 4/1975 | Collins et al. ................. | 244/50 |
| 4,702,843 A | * 10/1987 | Oswald et al. ............... | 280/707 |
| 5,897,073 A | * 4/1999 | McVaugh ................. | 242/399.1 |
| 6,095,500 A | * 8/2000 | McVaugh ................... | 254/361 |
| 6,105,707 A | * 8/2000 | Tamura et al. ............... | 180/307 |
| 6,125,954 A | * 10/2000 | Oota et al. .................. | 180/6.48 |

FOREIGN PATENT DOCUMENTS

| JP | 355110670 A | * 8/1980 | ................. 180/6.48 |

\* cited by examiner

Primary Examiner—Brian L. Johnson
Assistant Examiner—Daniel Yeagley
(74) Attorney, Agent, or Firm—John S. Munday (57) ABSTRACT A drive mechanism for driving a vehicle, comprising a pair of drive wheels each having a drive shaft, a source of hydraulic oil under pressure on the vehicle and controlled by a control unit for delivering hydraulic oil in two directions, wherein the drive shafts of the pair of wheels are each driven by a high torque, low speed hydraulic motor or pump. The principal components of the motors include a crank shaft mounted in the housing for connection to the drive shafts of the wheels. At least two cylinder and piston assemblies are attached to the crank shaft for rotation of the crank shaft upon movement of the pistons between a minimum and maximum point of travel in the cylinders to thereby impart motion to the wheel drive shaft. A valve assembly provides hydraulic fluid to the cylinders to sequentially move the pistons in the desired direction of piston travel. The two motors are mounted on the vehicle to form a transaxle unit, and controls permit simultaneous or independent operation of the two motors.

12 Claims, 9 Drawing Sheets

TRANSAXLE DEVICE

This is a continuation-in-part application of my co-pending application Ser. No. 09/074,642, filed May 7, 1998, now U.S. Pat. No. 6,095,500, issued Aug. 1, 2000, which in turn is a continuation in part of my application having application Ser. No. 08/692,380 filed Aug. 5, 1996, now abandoned.

FIELD OF THE INVENTION

The present invention relates to a transaxle device having a pair of high torque, low speed motors. More particularly the present invention relates to a transaxle and hydraulic motors of greatly improved power to weight design to provide on-road and off-road vehicle power.

BACKGROUND OF THE INVENTION

Once humanity discovered the wheel and put two of them together with an axle, vehicles have been designed for almost every purpose. Broadly, the development of motors has made vehicles efficient devices for moving persons and objects at faster speeds or with more power than otherwise has been possible. Steam and then internal combustion engines changed history, as persons and objects could be transported faster and farther with less effort than ever before.

Whether with internal combustion motors, electric motors, or any such device, power has been derived from rotation of a shaft, such as a crank shaft driven by pistons. The general rule has been the more power that is needed, the faster the revolutions per unit of time of the motor. The only alternative to higher rpms is a larger motor. Hydraulic motors, however, have not been used in many instances as actual drive applications for vehicles, primarily because the requirements of such a motor can't be met by conventional hydraulic motor designs. The primary drawback is that prior hydraulic motors are designed to drive a shaft, usually in combination with a transmission or gear box. While this would be appropriate for a vehicle using a transmission, such as a lawn mower or other vehicle not requiring much power, hydraulic motors are not as effective over large rpm ranges as the readily available gasoline motors used on such devices.

One form of hydraulic motor that has found use in industry is the low speed/high torque hydraulic motor, although it has not been applied to drive vehicles to this date because of certain drawbacks listed below. These low speed and high torque hydraulic motors come in two basic forms and in a variety of designs. The motors either are gear reduction motors or radial piston motors. In the former, high speed motors are reduced using a complicated series of gears to lower the speed and achieve higher torque. In the latter, various schemes for moving fluids around the axis of a crankshaft have been provided. Neither is suitable for use with, for example, a compact design mounted on a small vehicle where high power is needed. My U.S. Pat. No. 5,897,073 illustrates the use of an improved motor for holding extremely large and heavy spools of those cables. Even in that example, the vehicle itself is diesel engine driven.

Vane motors employ pressure against a plurality of vanes riding on a ring cam to form sealed chambers that carry fluid through the device, optimally at low pressure. The major disadvantage is that there are too many leakage paths. Rolling-vane motors sequence fluid flow to put high pressure against trailing surfaces and low pressure against leading surfaces, but are limited in displacement There are also a variety of piston motors. Radial piston motors have a wide displacement range and are very efficient in medium or high displacement ranges. Cam type radial piston motors are less efficient and have difficulty at low speed. Axial piston motors are effective and have good starting torque characteristics. Two sources of heavy duty hydraulic motors are Nutron Motor Co., Inc. in Eliot, Me., which produces a radial piston hydraulic motor under the MHA series, and Kawasaki Precision Machinery, Inc. which produces radial piston hydraulic motors at its Staffa facility in Plymouth, England.

One of the principle drawbacks to hydraulic motors is that the commercial designs are extremely large for the power that is produced. Both the space or volume taken up by such motors and the weight that is needed are so great as to be seen as drawbacks or handicaps when selection of a motor is being made. In order to have useful torque in industrial applications, such as in heavy equipment, moveable boat and lumber lifts, end loaders, winches, and other hub drive designs, great amounts of power is needed. However, all presently known designs are not capable of effectively using the power of a short stroke, high displacement motor arranged within a compact area or motor volume so as to be adapted to the device of interest.

It would be of great advantage if an improved hydraulic motor for use with vehicles could be provided that would deliver the same or greater power using less space and having less weight than conventional motors which have been described.

In addition, it would be an advance in the art if high torque, low speed motors could be designed that did not require the use of multiple reducing gears to translate high speed motion into low speed, high torque output.

Also, it would be of significant advance if a vehicle could be provided with a hydraulic motor which could drive each of two wheels on an axle independently, such as when using a transaxle. Such a device could be used to drive each wheel separately, or, in another configuration, drive two tracks independently.

Finally, it would be an advantage if had the capability of self braking, so that no additional brake device would be needed for the vehicle. In other words, it would be a great advance if the motor could stop at any pre-selected point without the use of additional brake elements.

Accordingly, it is an object of the present invention to provide a transaxle device driven by an hydraulic motor capable of operating under high torque and low speed, such motor being suitable for operation in a smaller space than prior art designs.

A further object of this invention is to provide a transaxle device and hydraulic motor configuration capable of producing high torque and low speed without the need for multiple reducing gears to translate high speed motion into the resultant high torque and low speed.

Yet another object of the present invention is to provide a vehicle having a hydraulic motor having fixed displacement of substantially larger capacity than currently available for transaxle applications, so as to provide orders of magnitude more power in a small enough space to operate on both wheels on the axle.

Other objects will appear hereinafter.

SUMMARY OF THE INVENTION

It has now been discovered that the above and other objects of the present invention may be accomplished in the following manner. Specifically, the present invention provides a transaxle device of reduced size and increased power, capable of operating under high torque and low speed. The device is suitable for operation in a smaller space than prior art designs, so that vehicles can be equipped with a pair of motors to radically increase the power of any given size of vehicle.

The present invention comprises a pair of hydraulic motors, described below, which operate using hydraulic fluid under pressure from a source carried on the vehicle. The vehicle frame, a structural bridge or other component, is arranged to mount each motor so that the output shaft is operably connected to a wheel. In one embodiment the wheel is a conventional wheel, perhaps with a rim and tire, or, alternatively with cogs for engagement of a track used in bulldozers and the like.

The principal components of the motor or pump include a crank shaft mounted in the housing for connection to a shaft on which a wheel is attached for direct drive. Cylinder and piston assemblies are attached to a crank shaft for rotation upon movement of the pistons in the cylinders to thereby impart motion to the crank shaft and, thus, the wheel shaft or axle.

The hydraulic circuit is designed so that the left and right driving wheels on the vehicle are free to seek their own rate of rotation as the vehicle is steered in turns, while continuing to applying full power to each wheel. The motors themselves can be in one common axle assembly or individually mounted to the vehicle, such as on the main frame or some component attached thereto.

BRIEF DESCRIPTION OF THE DRAWINGS

For a more complete understanding of the invention, reference is hereby made to the drawings, in which.

DETAILED DESCRIPTION OF THE PREFERRED EMBODIMENT

As shown in the drawings, the present invention provides a hydraulic motor employing dual action on a piston, so as to push as well as pull the piston with a power stroke. Shown in FIG. 1 is a schematic flow diagram illustrating the way that fluid flows into a pair of pistons to drive a shaft The hydraulic lines route fluid in one end to push the piston to maximum position, then fluid is introduced to the other side of the piston as pressure is released on the first side so that the fluid continues to drive the piston to its minimum position with respect to the crank shaft.

Figure 1:
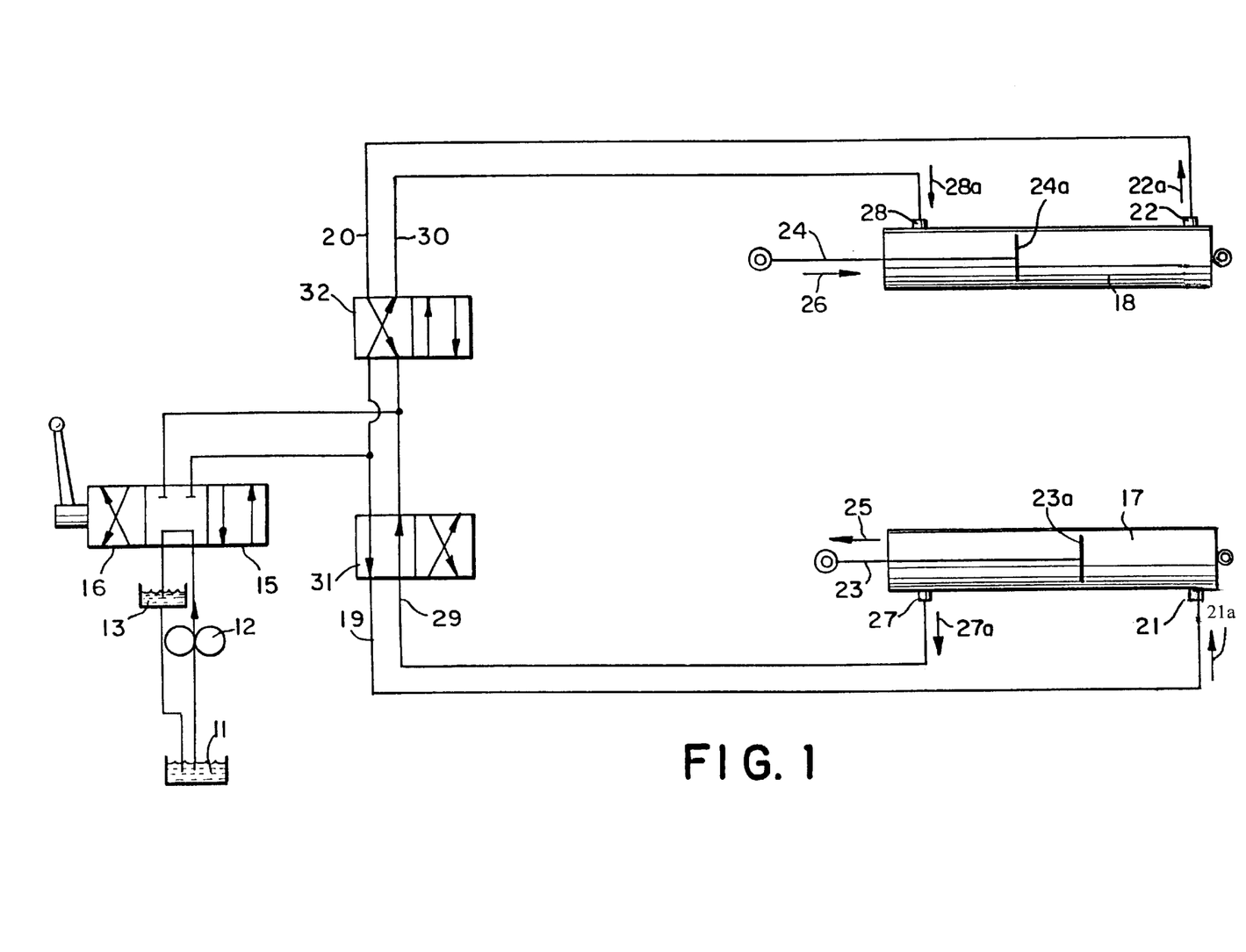
FIG. 1 is a schematic view showing the hydraulic flow system utilized in the motor used in this invention.

Specifically shown in FIG. 1 is a source of hydraulic fluid 11 that is routed under pressure by pump 12. A return chamber 13 functions to receive the return of fluid under reduced or low pressure and return it to source 11. Valve 15 transmits high pressure hydraulic fluid from pump 12 and functions as a forward/reverse control, so that the motor operates to rotate in a first or forward direction of rotation or in a second or reverse direction of rotation.

Valves 31 and 32 serve to direct the high pressure fluid in one direction for the first cylinder 17 and in the opposite direction for second cylinder 18. High pressure hydraulic fluid flows through valve 31 via line 19 into first port 21 of cylinder 17, as shown by the inlet arrow 21a, pushing piston rod 23 in the direction of arrow 25. Hydraulic fluid exits cylinder 17 at second port 27 as shown by the outlet arrow 27a, to be returned via line 29 to return chamber 13 through valve 15. Valve 31 functions to control flow in lines 19 and 29. Fluid entering port 21 forces the piston head 23a on piston rod 23 to move in the direction of arrow 25 until it reaches its maximum point of travel.

At the same time, high pressure hydraulic fluid flows in a second direction via line 30 through valve 32 into second port 28 of cylinder 18, as shown by the inlet arrow 28a, pulling piston rod 24 in the direction of arrow 26. Hydraulic fluid exits cylinder 18 at first port 22 as shown by the outlet arrow 22a, to be returned via line 20 to return chamber 13 through valve 15. Valve 32 functions to control flow in lines and 30. Fluid entering port 28 forces the piston head 24a on piston rod 24 to move in the direction of arrow 26 until it reaches its minimum point of travel.

When valve 31 senses that piston rod 23 has reached its maximum stroke, as will be shown in several embodiments below, flow in lines 19 and 29 is reversed, so that high pressure fluid enters second port 27 in the opposite direction to arrow 27a, forcing the piston head 23a on piston rod 23 to move in the opposite direction to arrow 25. Pressure in line 19 is released by valve 31 so that low pressure fluid exits cylinder 17 via first port 21 in the direction opposite to arrow 21a. Similarly when valve 32 senses that piston rod 24 has reached its minimum stroke, as will be shown in several embodiments below, flow in lines 30 and 20 is reversed, so that high pressure fluid enters first port 22 in the opposite direction to arrow 22a, forcing the piston head 24a on piston rod 24 to move in the opposite direction to arrow 26. Pressure in line 30 is released by valve 32 so that low pressure fluid exits cylinder 18 via second port 28 in the direction opposite to arrow 28a. As can be appreciated, both cylinder 17 and cylinder 18 have what is called a null point or dead point when hydraulic pressure is switching from high to low on one side or the other of the piston head 23a, 24a, respectively. For that reason, when two pistons are used, as in FIG. 1 and elsewhere, the piston cycles are offset from each other, preferably by 90°, so that at least one piston is driving in one direction while the other piston is at null as the direction of high pressure flow reverses for that other piston.

Figure 2A:
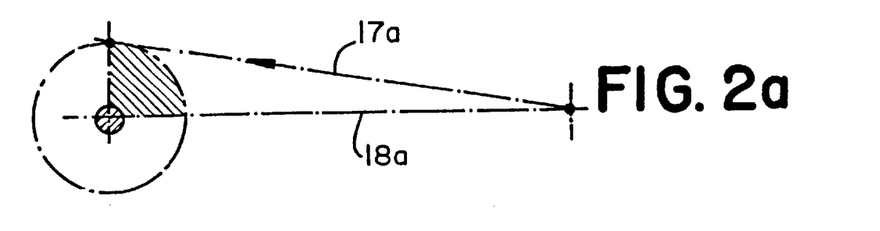
FIG. 2 is a schematic view illustrating a sequence of high and low pressure on both sides of a piston, with three views showing dead center, extending and retracting positions.
Figure 2B:
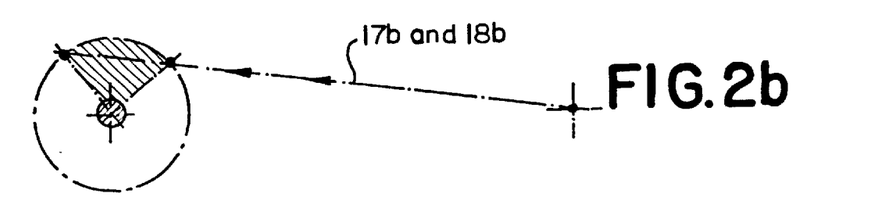
Figure 2C:
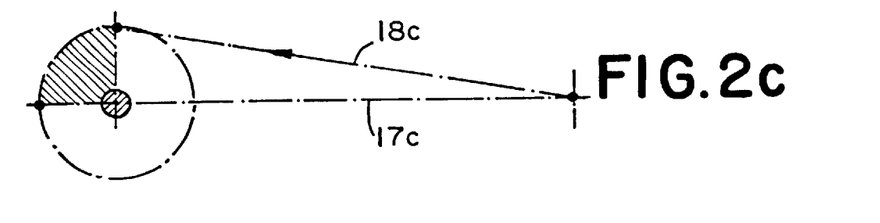
Figure 2D:
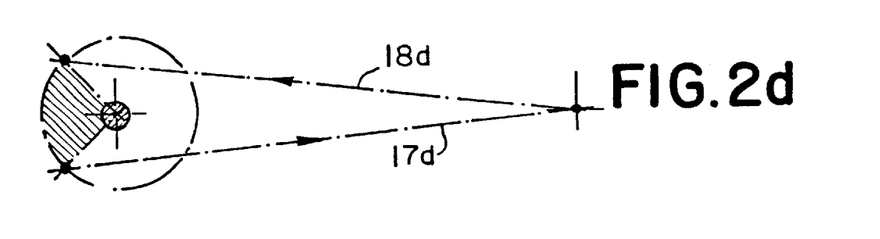
Figure 2E:
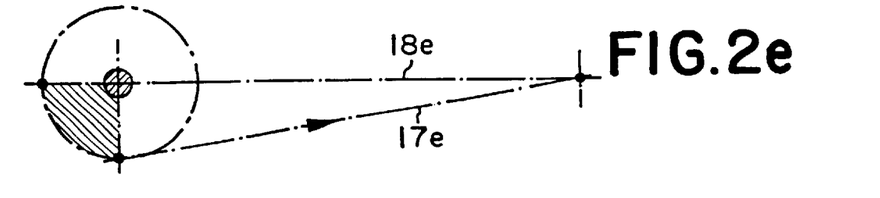
Figure 2F:
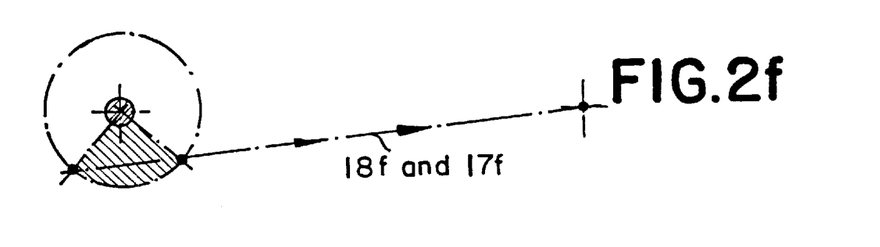

FIGS. 2a–2f illustrate the effort applied by two cylinders attached to a crankshaft through one revolution of that shaft FIG. 2a illustrates the situation when first cylinder 17a is being pushed by high pressure hydraulic fluid (the condition of cylinder 17 shown in FIG. 1) and second cylinder 18a is on dwell, providing no effort or movement to the shaft. FIG. 2b represents the point in the cycle when both 17b and 18b are pushing on their respective piston heads 23a and 24a. FIG. 2c is the opposite of 2a, with 18c pushing and 17c on dwell or null. As the shaft rotates, FIG. 2d represents the condition when 18d is pushing while cylinder 17d is now receiving high pressure hydraulic fluid on the opposite side of the piston head (the condition of cylinder 18 shown in FIG. 1). FIG. 2e represents the next condition, where 18e is on dwell and 17e is pulling, with pressure on the rod side of its piston head. Finally, FIG. 2f illustrates the condition where both 17f and 18f are pulling, with pressure as shown for cylinder 18 of FIG. 1. This completes one revolution of the shaft to which the pistons 17, 18 are connected. As can be seen, at all times there is positive hydraulic pressure urging at least one piston to drive the shaft, even when the other piston is at dwell or not exerting power. This not only provides for smoother power transmission, it allows for the motor to always have positive displacement when starting or stopping the motor.

Figure 3:
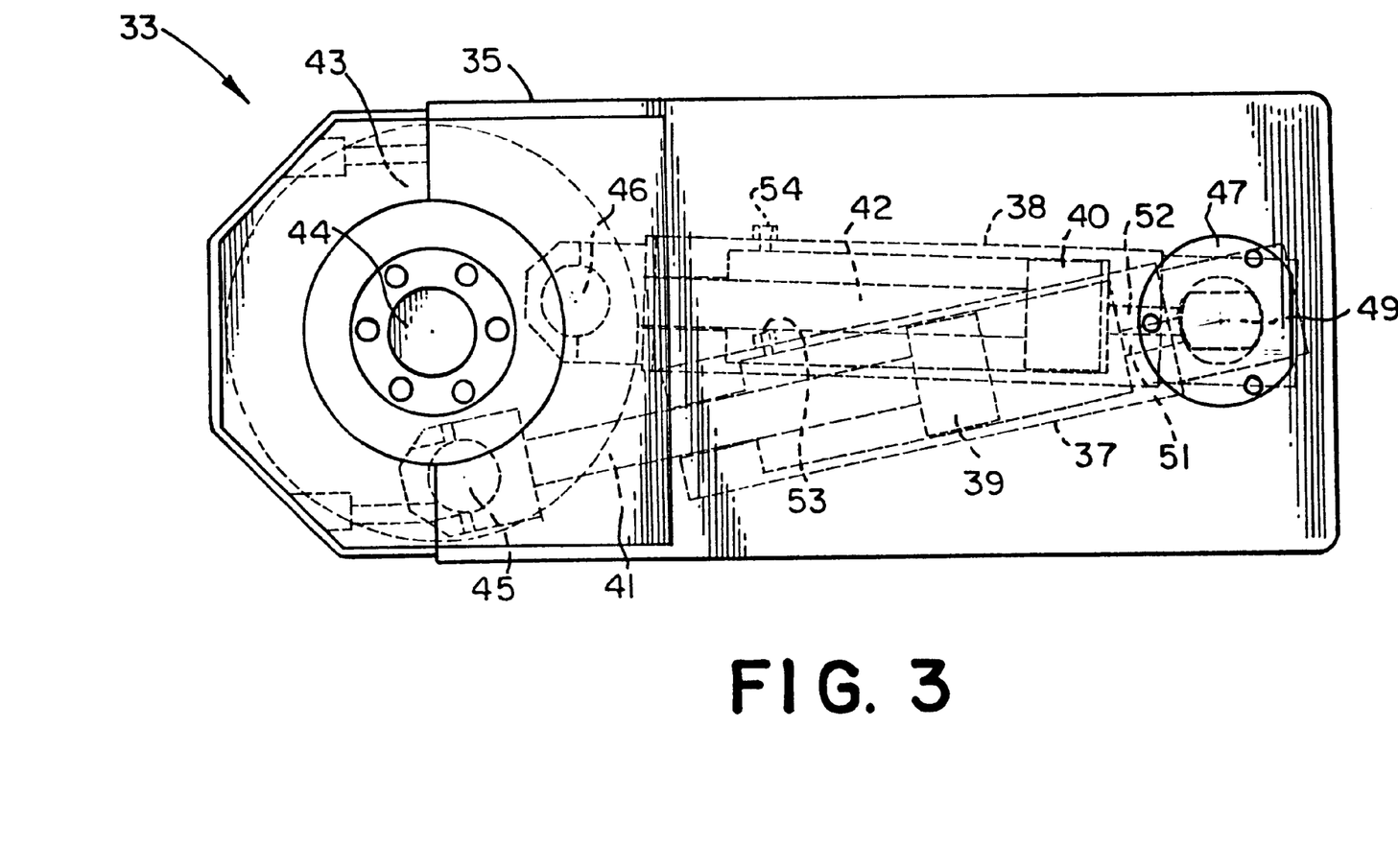
FIG. 3 is a side elevational view of the preferred embodiment of the present invention, with some moving parts shown in dotted line.

FIG. 3 illustrates the preferred embodiment of the present invention, where the motor 33 generally is enclosed in a housing 35. Cylinders 37 and 38 operate as illustrated in FIG. 2. Cylinder 37 is receiving high pressure hydraulic fluid on the top of piston head 39, driving piston rod 41 to its maximum position of extension, thereby rotating crank shaft 43 about axis 44, as piston rod 41 is attached to crank shaft 43 via crank pin 45. This corresponds to the schematic condition of cylinder 17 in FIG. 1.

FIG. 3 also illustrates the condition of cylinder 18 in FIG. 1, where cylinder 38 has high pressure hydraulic fluid on the rod side of piston head 40, thereby moving piston rod 42 to its minimum position and thus rotating crank shaft 43 about axis 44 as piston rod 42 pulls on crank shaft 43 via crank pin 46. Piston 42 is about to reach its dwell or null point, shown by 2a in FIG. 2.

Figure 4:
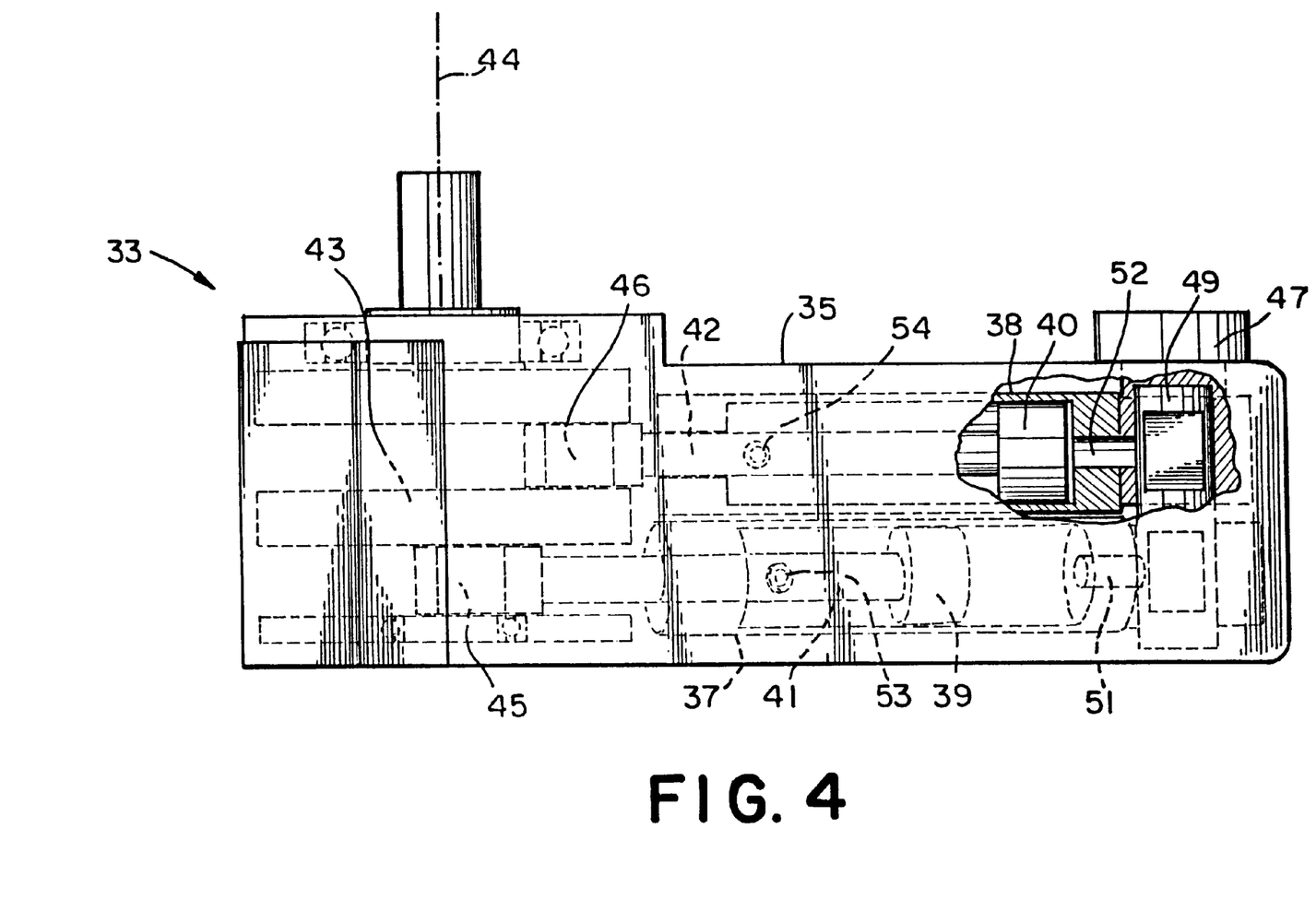
FIG. 4 is a plan view showing of the device shown in FIG. 3, again with some moving parts shown in dotted line.

FIG. 4 is a plan view of the device shown in FIG. 3, with the cylinders 37 and 38 in the same point of the motor cycle. FIG. 4 illustrates how hydraulic fluid under pressure is introduced into the cylinders via valve assembly 47. Valve assembly 47 provides for high pressure hydraulic fluid to flow along valve core 49, shown in the broken away portion, such that valve assembly 47 oscillates the same as cylinders 37 and 38 from maximum to minimum extension of rods 41 and 42 This travel is determined by the size of crank shaft 43 and the placement of points of attachment of rods 41, 42 via crank pins 45, 46 respectively.

Whatever the orientation of cylinders 37, 38, high pressure oil enters from valve assembly 47 along valve core 49 and communicates with one of two orifices in each cylinder 37 and 38, depending upon the specific location of the pistons. There is, of course, no flow when a piston is at dwell or null as both orifices are closed during the transfer from one direction of force to the other, such as from push to pull on crank shaft 43. Cylinder 37 is extending or pushing piston rod 41 as high pressure hydraulic fluid pushes on piston head 39, flowing from valve assembly 47 along valve core 49 to first orifice 51. Low pressure hydraulic fluid is also being expelled from behind piston head 39 via second orifice 53 for return in accordance with the flow shown in FIG. 1. Cylinder 38 is retracting piston rod 42, thereby pulling crank shaft 43 via crank pin 46, as high pressure hydraulic fluid flows along core 49 to second orifice 54 as low pressure fluid is expelled via first orifice 52.

Figure 5A:
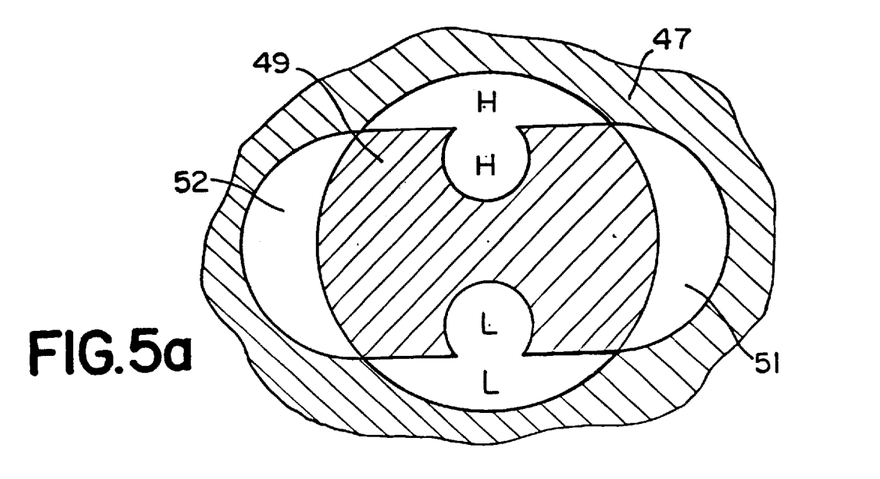
FIG. 5 is a schematic view of the valve operation of the device of FIGS. 3 and 4, showing high and low pressure fluid transfer.
Figure 5B:
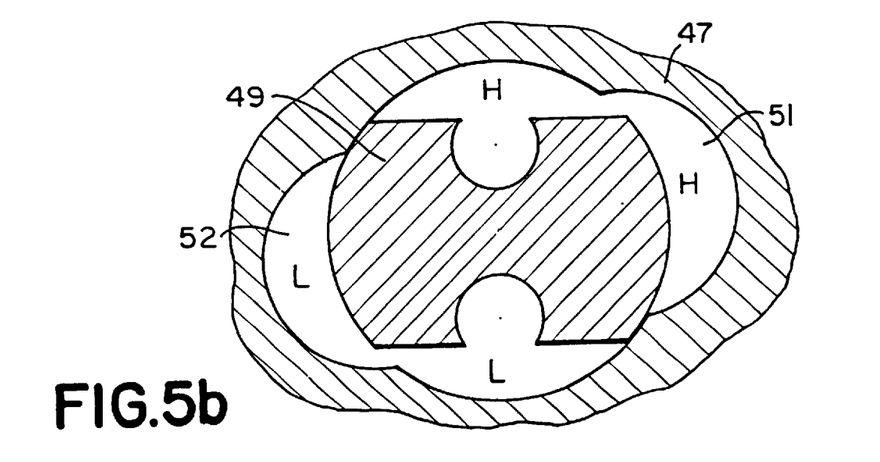
Figure 5C:
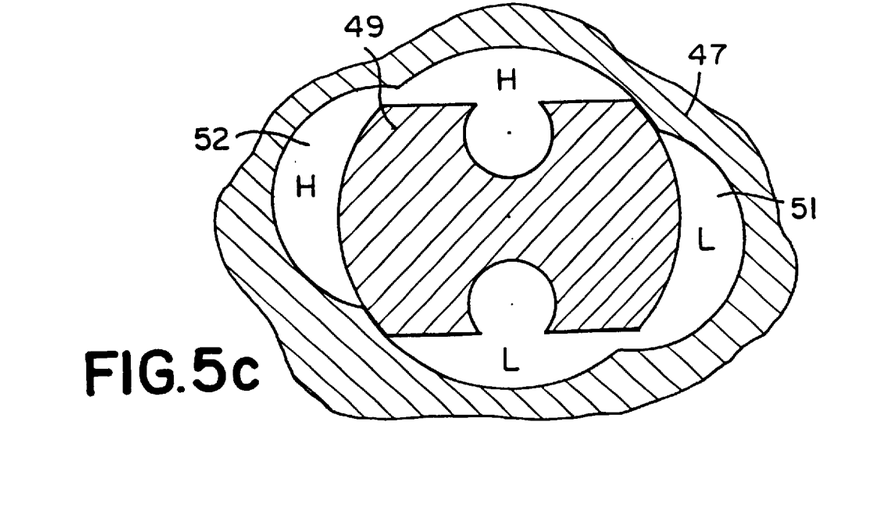

FIG. 5 illustrates the flow of hydraulic fluid about valve core 49 as it moves in valve assembly 47 to transfer high pressure H to one orifice and low pressure L return fluid to the other orifice for each piston assembly. Valve assembly 47 moves with respect to valve core 49 as described above as piston heads 39 and 40 cycle between maximum and minimum positions as cylinders 37, 38 oscillate. In 5a, high pressure fluid H enters valve assembly 47 along core 49 and low pressure fluid L exits. As cylinder 37, for example, rotates, core 49 remains fixed with respect to oscillating assembly 47 in 5b to allow high pressure fluid H to enter orifice 51 and low pressure fluid L is removed from behind piston head 39 via orifice 53. Further travel past a dwell point (similar to 5a) shows in 5c high pressure fluid H entering orifice 53 and low pressure fluid L exiting orifice 51. A similar but reverse flow takes place in cylinder 38, offset by 90° for example, to provide at least one positive force at all times, as shown in FIG. 2.

Figure 6:
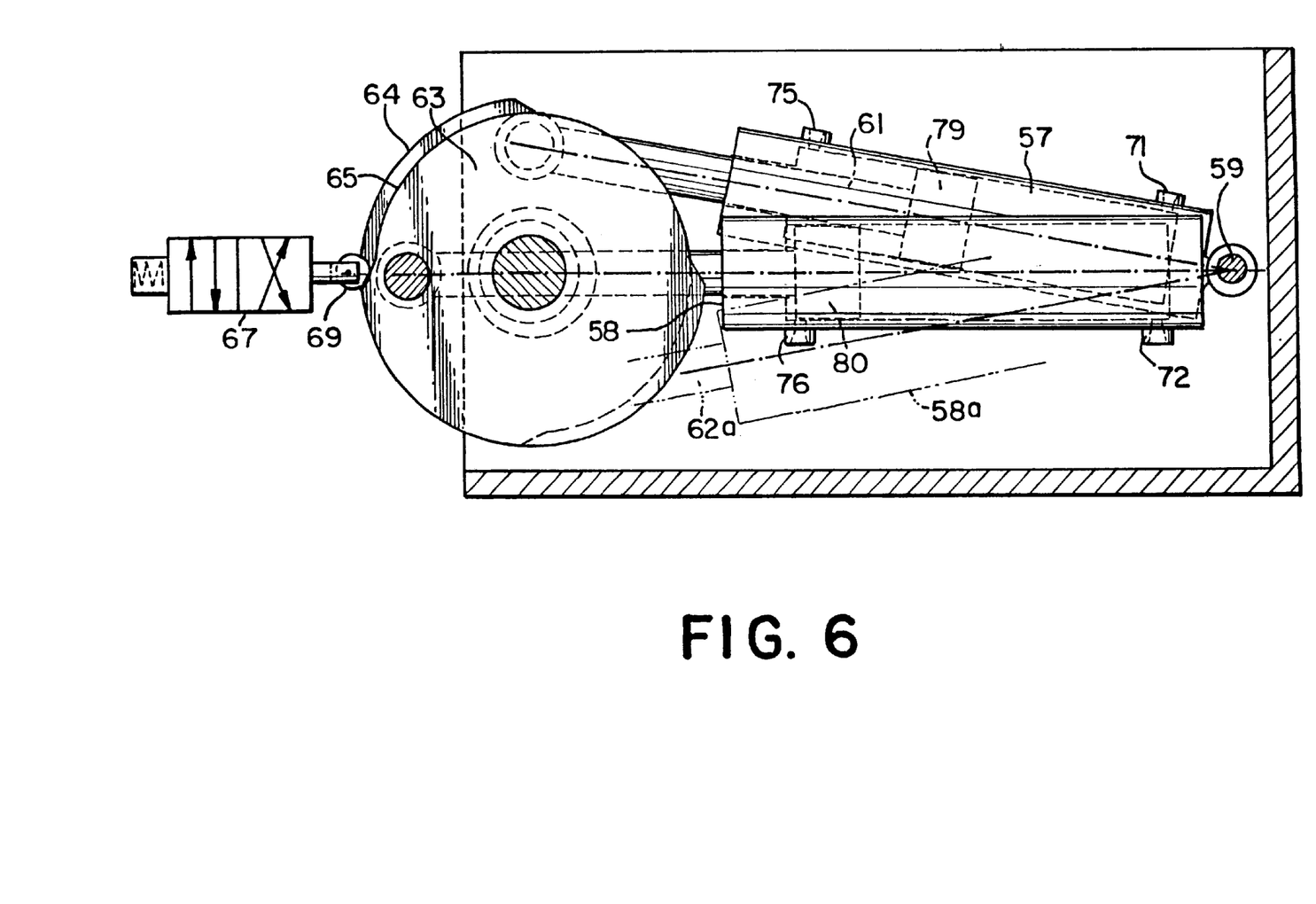
FIG. 6 is a side elevational view, partially in section along line 6—6 of FIG. 7, showing a second embodiment of the present invention, with some moving parts shown in dotted line.
Figure 7:
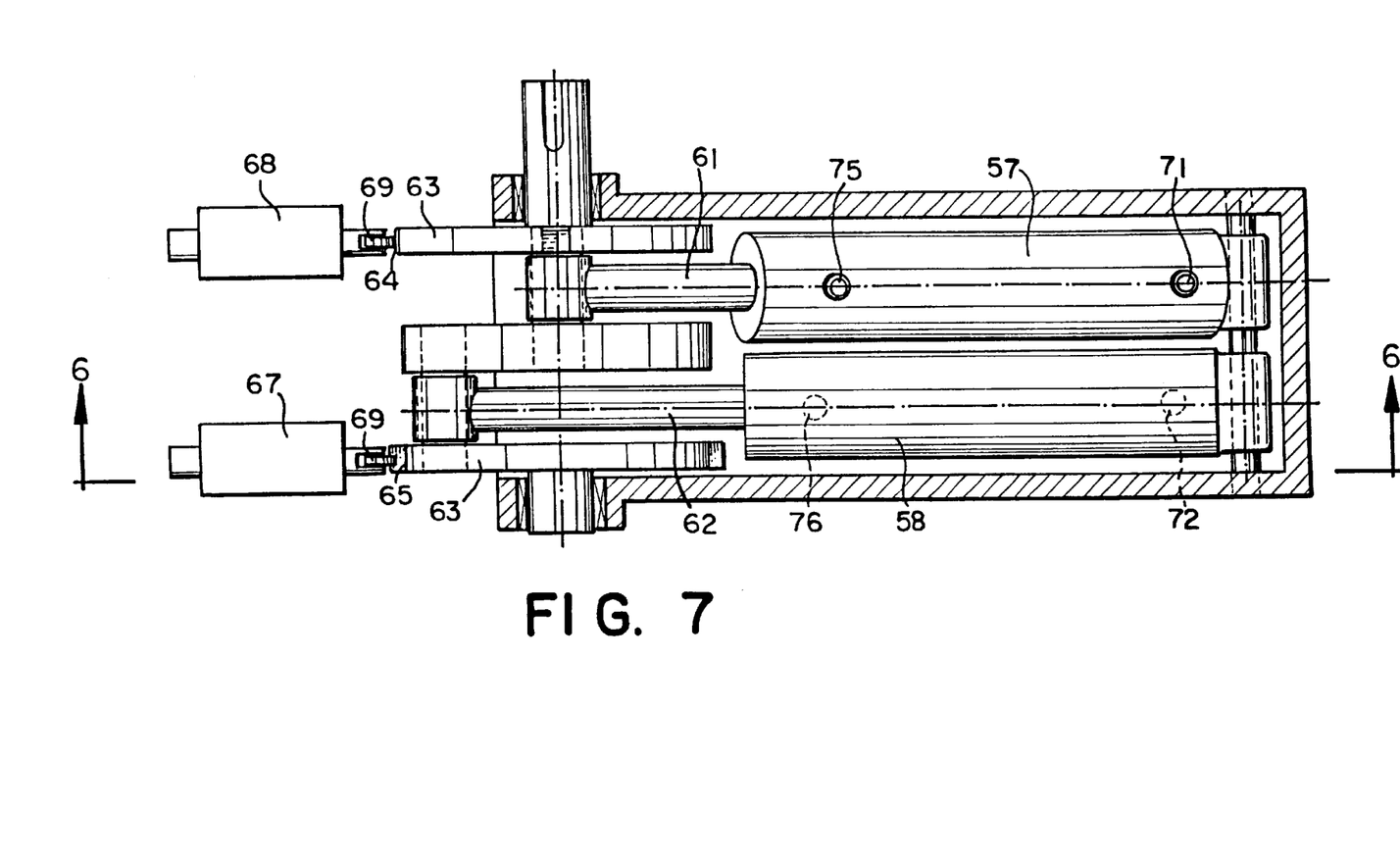
FIG. 7 is a plan view of the embodiment shown in FIG. 6, with some moving parts shown in dotted line.

In an alternative embodiment shown in FIGS. 6 and 7, hydraulic fluid flow is controlled at the opposite end from the device shown in FIGS. 4 and 5, yet the principle of operation is the same. Cylinder 57 oscillates about shaft 59 as piston rod 61 moves about crank shaft 63. Cylinder 58 also oscillates about shaft 59 as piston rod 62 also moves about crank shaft 63. For illustration purposes, one cylinder 58 is shown in the dwell location. It should be appreciated that there are only two cylinders in use. In this embodiment, crank shaft 63 includes an outer cam surface 64 and an inner surface 65, so that valves 67 engage these surfaces via spring biased roller 69. When roller 69 is on the inner surface 65, hydraulic fluid flows to port 71 to push piston head 79 and piston rod 61 toward crank shaft 63. Alternatively when roller 69 is on outer cam surface 64, hydraulic fluid flows to port 75 to move piston head 80 away from crank shaft 63 so that rod 61 pulls crank shaft 63 to cause further rotation thereof.

FIG. 7 illustrates the operation of this two piston embodiment of cylinders 57, 58 where first one and then the other piston moves its piston rod 61, 62 on the crank shaft 63 as fluid flows in or out of ports 71, 75 and 72, 76 respectively. In this embodiment as well as that of FIGS. 4 and 5, the two cylinders 57, 58 travel through the cycles illustrated in FIG. 2

While springs and cams have replaced the valve assembly of FIGS. 4 and 5, operation is still based upon the unique and efficient principle of having hydraulic fluid act alternatively upon both faces of a piston in a cylinder, so that positive force is used to move the piston in both directions. An enormous amount of power is achieved when such motors are used as low speed/high torque hydraulic motors. Working models have been constructed that operates at 3500 psi and has a capability of generating up to 22,000 foot/pounds of torque or more. Tests have shown these motors to operate for 100 hours at full pressure without any leakage or other problems.

The motors may be reversed on command, and have a braking function and may be locked solid by control of the fluid pressure flow, or they may move incrementally as desired. As set forth above, the motor functions also as a pump when energy is applied to the crank shaft The housing that supports the motor should be solidly constructed to have high torsional rigidity. The unique push and pull action provides high torque, creating a large displacement motor in a compact package.

The device may be used to power a winch, or as a wheel motor for a garden tractor, a large tractor, a boat lift and storage vehicle, an airplane towing vehicle, a crane or lift that can be placed on a truck bed or other vehicle, as a pump, and in many other industrial applications. This hydraulic motor is capable of functioning in most, if not all situations where conventional low speed/high torque hydraulic motors and the like are used, bringing the device of this invention's unique power and size advantages. While hydraulic fluids such as oil are preferred, the present invention will also function with other fluids such as water, compressible fluids such as inert gases, and the like. The shape of the motor of this invention lends itself to applications where the output of the shaft is at the end of a beam or column, such as in a lifting boom/beam. In one proposed design, the wheels are at the end of stork-like legs that extend down from a platform, such that the motor mechanism is within the leg rather than in the wheel. This provides for increased strength and reliability, among other advantages.

Figure 8:
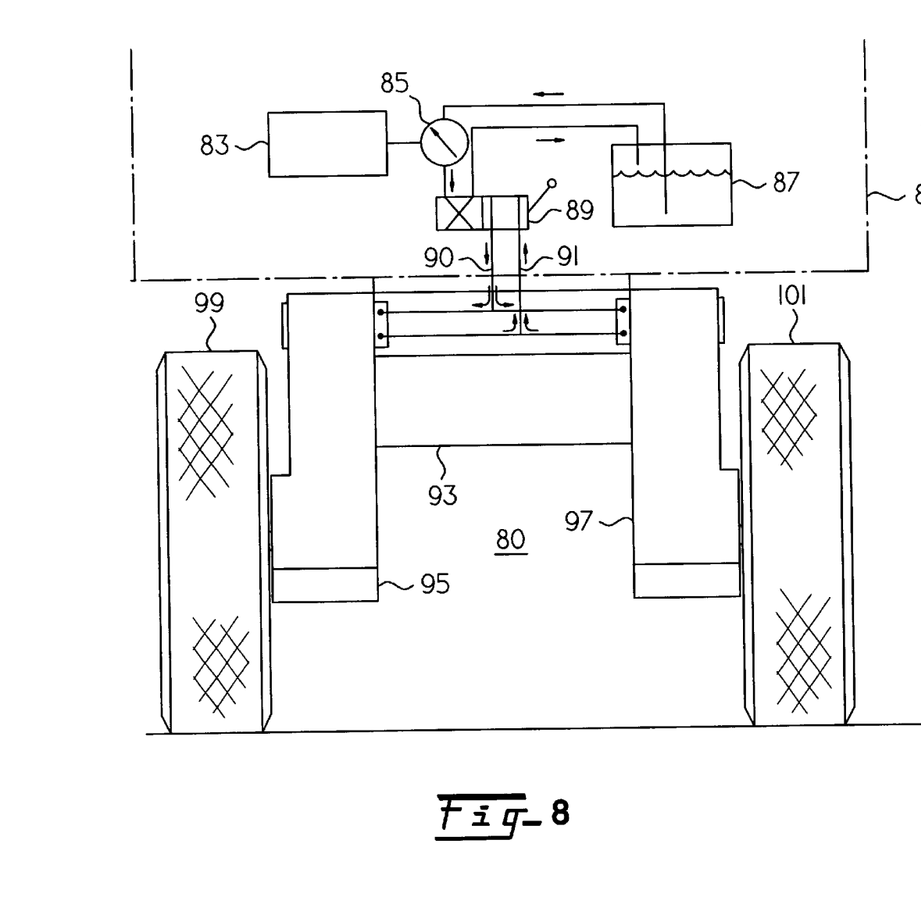
FIG. 8 is an end view of the preferred embodiment of the present invention, showing the transaxle having two motors attached thereto to drive the rear wheels of a vehicle.
Figure 9:
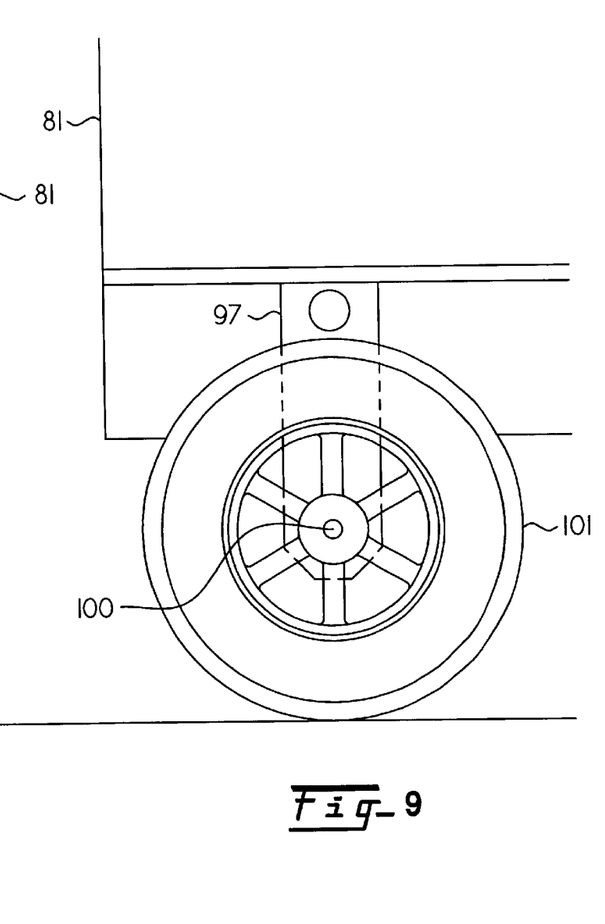
FIG. 9 is a side elevational view of the preferred embodiment of FIG. 8.

Turning now to FIGS. 8 and 9, the preferred embodiment is shown generally by the reference numeral 80, and includes a vehicle body 81, a vehicle engine or motor 83, a variable displacement hydraulic pump 85 which delivers hydraulic oil under pressure from the reservoir 87 through a control unit 89, which is adapted to provide forward and reverse flow of oil. Hoses 90 and 91 transfer oil under pressure from the control unit 89 as shown by the arrows along a structural bridge 93, which may be part of the vehicle frame or may be an independent element mounted on the vehicle body 81 as desired. Motors 95 and 97 are also supported on the structural bridge 93 to form the transaxle unit of this invention. Output shafts from motors 95 and 97 drive wheels 99 and 101, respectively, being attached to said wheels via shafts 100 mounted in hubs and best seen in FIG. 9.

The motors 95 and 97, as previously described with respect to FIG. 1, for example, are low speed, high torque motors which operate to drive wheels 99 and 101, providing direct engine power to wheel tractive effort without gears and, of course, without gear reductions. The two motors 95 and 97 have a differential action, such that the right and left wheels 99 and 101 are free to seek their own rate of rotation as the vehicle is steered in turns while maintaining full power applied to each wheel.

Figure 10:
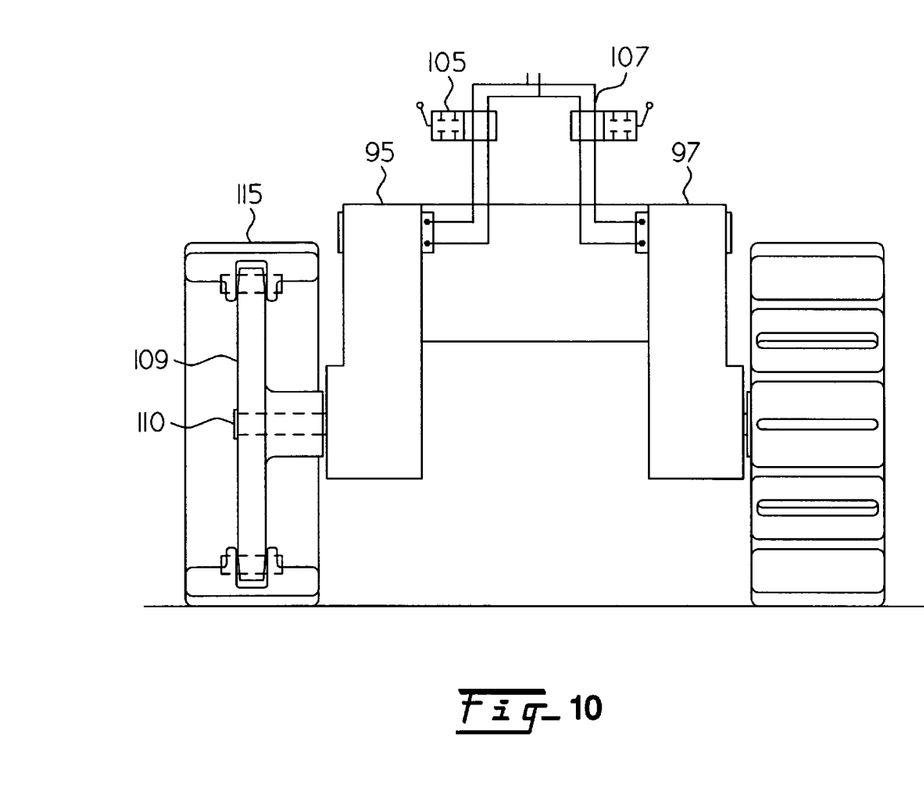
FIG. 10 is an end view of an embodiment of the present invention, showing the transaxle having two motors attached thereto, to drive a track assembly for a vehicle.
Figure 11:
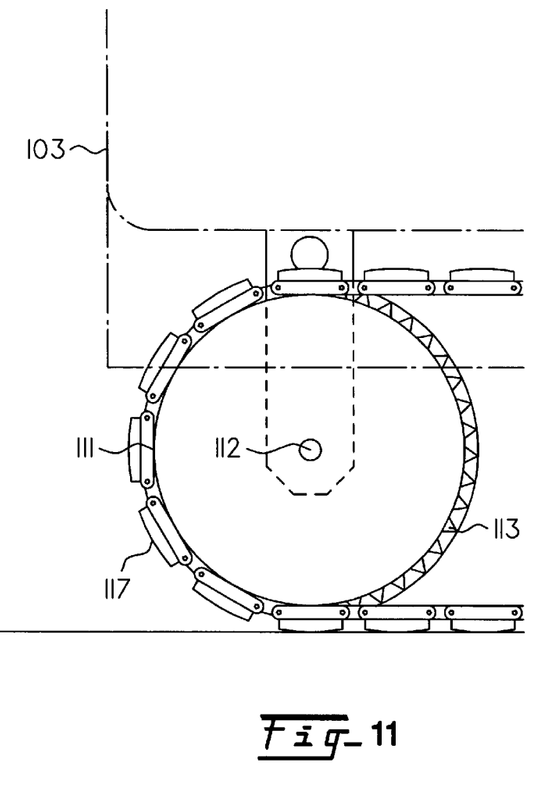
FIG. 11 is a side elevational view of the embodiment of FIG. 10.

In an alternative embodiment shown in FIGS. 10 and 11, motors 95 and 97 are adapted to drive a track such as used with bulldozer 103 and other slow moving tracked vehicles normally used off-highway. Two control units 105 and 107 separately control motors 95 and 97 to function as skid steering valves. The bulldozer 103 includes a drive wheels 109 and 111, driven by motors 95 and 97 respectively through shafts 110 and 112 respectively, wherein drive wheels 109 and 111 have drive sprockets 113 for engagement with tracks 115 and 1 17, respectively. Control units 105 and 107 function as restricting flow control valves to provide skid steering, as is the normal case with bulldozers and the like.

In summary, the present invention of a transaxle device operates using the motor of this invention to produce substantially improved results, using a constant displacement motor for each side of the axle. Motors of this type may operate at speeds of 0 to 20 rpm or more, and have been tested by operation at full pressure for over 100 hours without any hydraulic oil leakage. The cost per unit of motor size, such as cubic centimeters of cylinder size is less than half of that for hydraulic motors using gear reductions, primarily because of the simplicity of design of the motor, but more importantly, the motors of this invention are the first to be positionable to directly drive a pair of wheels, or skids, in a simple, efficient design While particular embodiments of the present invention have been illustrated and described, it is not intended to limit the invention, except as defined by the following claims.

What is claimed is:

1. A drive mechanism device for driving a vehicle, comprising:

a vehicle for mounting said drive mechanism;

a pair of drive wheels each having a drive shaft;

a source of hydraulic fluid under pressure on said vehicle, said hydraulic fluid being controlled by control unit on said vehicle for delivering hydraulic fluid in two directions; and a pair of hydraulic motors operably connected to said control unit for receiving hydraulic fluid under pressure, each motor being operable to engage a drive shaft from one of said drive wheels to thereby mount said one of said drive wheels on said vehicle, said motors being mounted on said vehicle to form a transaxle for driving said drive wheels to move said vehicle;

said pair of hydraulic motors including a housing; a crank shaft mounted in said housing for attachment to said drive shaft having at least two throws; at least two cylinder and piston assemblies having two faces and being attached to said crank shaft for rotation of said crank shaft upon movement of said pistons between a minimum and maximum point of travel in said cylinders to thereby impart motion to said crank shaft, said at least two cylinders being located on the same side of said crank shaft and attached at said pivotal point and said throws in an offset alignment with respect to each other such that each piston reaches its said minimum and maximum point of travel while the other is offset from its own said minimum and maximum points of travel said cylinders being attached to said crank shaft at one end and to a common pivotal point at the other end thereof, and valve means for providing hydraulic fluid to said cylinders under pressure to sequentially move each said piston between its said minimum and maximum points of travel by providing hydraulic fluid under pressure on said piston in the desired direction of piston travel while evacuating hydraulic fluid under lesser pressure from said cylinder in the other direction of piston travel and valve means for providing hydraulic fluid to said cylinders and selectively to both faces of said pistons to impart movement thereof to sequentially move each said piston between its said minimum and maximum points of travel by providing hydraulic fluid under pressure on said piston in both desired directions of piston travel while evacuating hydraulic fluid from the other side of said piston, said movement of said pistons in said cylinders causing oscillation of said cylinders about said pivotal point and in said parallel planes to thereby actuate said valve means solely by said oscillation; said valve means comprising a valve assembly having a valve core for transmitting hydraulic fluid within said assembly; first and second port means on each of said cylinders for introducing hydraulic fluid from said valve assembly selectively to both faces of said pistons to impart movement thereof; and first and second orifices in said valve assembly for each of said cylinders, said orifices being positioned to communicate with said port means selectively to direct flow from said valve core to and from said port means.

2. The device of claim 1, wherein said at least two cylinders are offset with respect to each other by about 90° of rotation of said crankshaft such that each piston reaches its minimum and maximum points of travel while the other is at its maximum point of mechanical advantage.

3. The device of claim 2, wherein said valve means provides hydraulic fluid under pressure on one face of each of said pistons to move said pistons in the desired direction of piston travel while evacuating hydraulic fluid under lesser pressure from the opposite face of said piston in said cylinder in the other direction of piston travel.

4. The device of claim 1, wherein said hydraulic fluid is oil.

5. The device of claim 1, wherein said drive wheels include pneumatic tires for use on and off road.

6. The device of claim 1, wherein said drive wheels include drive sprockets and said vehicle further includes drive tracks.

7. The device of claim 6, which further includes a skid steering control valve for each of said pair of motors to permit skid steering of said vehicle.

8. A drive mechanism device for driving a vehicle, comprising:

a vehicle for mounting said drive mechanism;

a pair of drive wheels each having a drive shaft;

a source of hydraulic oil under pressure on said vehicle, said hydraulic oil being controlled by control unit for delivering hydraulic oil in two directions; and a pair of hydraulic motors operably connected to said control unit for receiving hydraulic oil under pressure, each motor being operable to engage a drive shaft from one of said drive wheels to thereby mount one of said drive wheels on said vehicle, said motors being mounted on said vehicle to form a transaxle for driving said drive wheels to move said vehicle;

said pair of hydraulic motors including a housing; a crank shaft mounted in said housing for attachment to said drive shaft having at least two throws; at least two cylinder and piston assemblies having two faces and being attached to said crank shaft for rotation of said crank shaft upon movement of said pistons between a minimum and maximum point of travel in said cylinders to thereby impart motion to said crank shaft, said at least two cylinders being located on the same side of said crank shaft and attached at said pivotal point and said throws in an offset alignment with respect to each other by about 90° of rotation of said crankshaft such that each piston reaches its said minimum and maximum point of travel while the other is offset from its own said minimum and maximum points of travel, said cylinders being attached to said crank shaft at one end and to a common pivotal point at the other end thereof; and valve means for providing hydraulic oil to said cylinders under pressure on one face of each of said pistons to move said pistons in the desired direction of piston travel while evacuating hydraulic oil under lesser pressure from the opposite face of said piston in said cylinder in the other direction of piston travel to sequentially move each said piston between its said minimum and maximum points of travel, said valve means including a valve assembly having cam driven valve means for directing flow of hydraulic oil in response to the location of said valve means on said crank shaft, first and second port means on each of said cylinders for introducing hydraulic oil from said valve assembly selectively to both faces of said pistons to impart movement thereof, and said movement of said pistons in said cylinders causing oscillation of said cylinders about said pivotal point and in said parallel planes to thereby actuate said valve means solely by said oscillation.

9. The device of claim 8, wherein said drive wheels include pneumatic tires for use on and off road.

10. The device of claim 8, wherein said vehicle is intended for off road use.

11. The device of claim 10, wherein said drive wheels include drive sprockets and said vehicle further includes drive tracks.

12. The device of claim 11, which further includes a skid steering control valve for each of said pair of motors to permit skid steering of said vehicle.

* * * * *